United States Patent [19]

Dessau

[11] 4,272,288
[45] Jun. 9, 1981

[54] CONCENTRATION, SEPARATION AND RECOVERY OF PRECIOUS METALS

[75] Inventor: Ralph M. Dessau, Edison, N.J.

[73] Assignee: Mobil Oil Corporation, New York, N.Y.

[21] Appl. No.: 80,634

[22] Filed: Oct. 1, 1979

[51] Int. Cl.³ .............................................. C22B 11/04
[52] U.S. Cl. .............................. 75/101 BE; 75/108; 75/121; 252/459; 423/22
[58] Field of Search ............... 75/101 BE, 121, 108; 252/460, 459, 455 Z, 466 PT, 412, 413; 423/22

[56] References Cited

U.S. PATENT DOCUMENTS

| | | | |
|---|---|---|---|
| 2,397,575 | 4/1946 | Tiger et al. | 75/108 X |
| 2,653,089 | 9/1953 | Brooke | 75/108 |
| 3,473,921 | 10/1969 | Schmuckler | 75/101 BE X |
| 3,702,886 | 11/1972 | Argauer et al. | 423/328 |
| 3,709,979 | 1/1973 | Chu | 423/328 |
| 3,920,449 | 11/1975 | Onoda et al. | 75/121 X |
| 3,999,983 | 12/1976 | Grosbois et al. | 75/101 BE |
| 4,002,575 | 1/1977 | Ward | 252/412 X |
| 4,016,245 | 4/1977 | Plank et al. | 423/328 |
| 4,069,040 | 1/1978 | Thomas et al. | 75/101 BE |
| 4,072,508 | 2/1978 | Vodicka et al. | 423/22 X |
| 4,076,842 | 2/1978 | Plank et al. | 423/328 |
| 4,077,800 | 3/1978 | Peka et al. | 75/108 |
| 4,130,506 | 12/1978 | Collier et al. | 252/466 PT |

*Primary Examiner*—G. Ozaki
*Attorney, Agent, or Firm*—C. A. Huggett; C. J. Speciale; G. W. Allen

[57] ABSTRACT

A process is provided for the concentration, separation and/or recovery of precious metals such as platinum and palladium via their soluble amine complexes from solutions by sorbing said complexes in one or more members of a novel class of zeolites. Said novel class of zeolites is characterized by a silica to alumina mole ratio of at least 12 and a constraint index in the approximate range of greater than about 2 to about 12.

37 Claims, No Drawings

CONCENTRATION, SEPARATION AND RECOVERY OF PRECIOUS METALS

BACKGROUND OF THE INVENTION

1. Field of the Invention

This invention is concerned with a process for the concentration, separation and/or recovery of precious metals, i.e. platinum and palladium.

2. Description of the Prior Art

In recent years, the chemical industry has unearthed a wide variety of applications for precious metals. The petrochemical industry, in particular, is one of the most prominent industries employing precious metals, especially in the area of catalysis. Thus, platinum catalysts, typically deposited on a carrier such as alumina and the like, are widely used in petrochemical applications for hydrogenation, dehydrogenation, cracking, refining, detoxification of waste gases, etc. Catalysts which comprise precious metals are particularly well known for the reforming of hydrocarbons.

Precious metals are being extensively used today in order to reduce pollution from motor vehicles. The engines employed in most motor vehicles today which utilize internal combustion engines, usually leave small amounts of unburned material in the exhaust gas as well as some nitrogen oxides and carbon monoxide. These substances pollute the air and can lead to serious health problems. In order to reduce emissions of these noxious substances, many automobile manufacturers have equipped their vehicles with "catalytic mufflers" ("catalytic converters") which oxidize the residual combustible matter to tolerable limits. In most instances, platinum on a refractory support, i.e. ceramic, is used as the catalyst in such mufflers.

Not only are precious metals very costly, but also the United States has virtually no internal supply of such metals and is forced to import them from the two major world suppliers, namely South Africa and the Soviet Union. The fact that the United States must rely on foreign supply of these precious metals adversely affects this nation's balance of payments.

After a period of use, precious metals are subject to a reduction in efficiency (deactivation). Once these metals are deactivated, they must either be replaced or reactivated. The high cost of precious metals dictates that reactivation is preferred over replacement. Regeneration of precious metals, however, is usually self-limiting, in that a point is reached at which regeneration is no longer effective. Thus workers in the art have focused their interest upon recovery and separation of precious metals, and it is to this end that the subject invention is addressed.

Various methods have been proposed for recovering precious metals, but many of these processes have drawbacks. Such drawbacks include loss of precious metals due to an excessive number of operations, and often incomplete separation of the precious metals.

Platinum recovery from spent catalysts by the use of fluorine treatment to form platinum fluoride which is then decomposed in described in U.S. Pat. Nos. 4,072,508 and 4,077,800.

Precious metals are recovered from spent catalysts by dissolving said catalysts in hydrochloric acid and then selectively extracting the metals. In U.S. Pat. No. 3,999,983, the precious metals are converted into complex compounds by adding hydrochloric acid and then treating the solution with an anion exchange resin. A similar process is described in U.S. Pat. No. 4,069,040.

Group VIII precious metals are recovered from organic solutions of their organophosphorus complexes by burning with oxygen in U.S. Pat. No. 3,920,449.

Precious metals can also be recovered from spent catalysts by heating in a gas stream containing carbon monoxide and chlorine and thereafter adsorbing said metals on either activated carbon, or in an aqueous medium.

SUMMARY OF THE INVENTION

In accordance with the present invention, there has now been discovered a process for the concentration, separation and/or recovery of precious metals, e.g. platinum and palladium. The process of the instant invention involves the selective removal of precious metals via their amine complexes from dilute aqueous solutions by sorption in a member of a novel class of zeolites. Recovery of the precious metals from the zeolite is achieved through desorption by ion exchange. The novel class of zeolites of the present invention is characterized by a silica to alumina mole ratio of at least 12 and a constraint index within the approximate range of greater than about 2 to about 12.

DESCRIPTION OF SPECIFIC EMBODIMENTS

By utilization of the novel processes of this invention, precious metals such as platinum and palladium can be separated and recovered from spent catalysts and catalytic mufflers, as well as separated from such metals as rhodium, iridium and cobalt by the process of the instant invention.

In order to conduct the process of this invention the precious metal desired to be concentrated, separated and/or recovered must be in the ammine complex form, e.g. $Pt(NH_3)_4^{+2}$ or $Pd(NH_3)_4^{+2}$. Such complexes can be formed by first dissolving the precious metal in an acid, e.g. aqua regia, and then adding an amine such as ammonium hydroxide, i.e. ammonia solution until the entire solution becomes basic. Alternatively, a salt of the precious metal, e.g. platinum chloride, can be contacted with an amine solution, e.g. ammonia solution, till basic to form the square-planar ammine complex.

The ammine complexes thus formed and in dilute aqueous solution are then contacted with one or more members of the novel class of zeolites of this invention. While not wishing to be bound by any particular theory of operability, it is believed that such separations and recoveries of said precious metals are based on the extremely high ion-exchange affinity of the novel zeolites of the present invention. The instant invention can be achieved even in the presence of high salt concentrations due to the great affinity of the novel class of zeolites of this invention for these complexes.

Recovery of the precious metals from said zeolites can be attained through desorption by ion exchange with an appropriate cation. A preferred cation for such recovery is an ammonium or alkylammonium ion, with the tetramethylammonium ion particularly preferred since such ion has a high affinity for the zeolite and can be readily separated from the precious metal. The precious metals can then be concentrated by such means as evaporation. The precious metals can be ultimately recovered by treatment with reducing agents, e.g. hydrogen, hydrazine or by thermal decomposition.

Once the precious metal is desorbed from the zeolite, it may be desirable in some cases depending on the particular desorbing cation utilized and the final form of zeolite desired to regenerate the zeolite by calcination at elevated temperatures and if desired, followed by base exchange. For example, if the desorbing cation utilized is sodium and a sodium zeolite is desired, then no further treatment is required. On the other hand, if tetramethylammonium is used as the desorbing cation and if a hydrogen zeolite is desired; then regeneration would be required.

Alternatively, in some cases, the precious metal may need not be recovered from the zeolite and the precious metal containing zeolite can be recycled as is for use in such applications as components of catalytic mufflers or as components of precious metal catalyst compositions.

The zeolites utilized herein are members of a novel class of zeolites exhibiting some unusual properties. These zeolites induce profound transformation of aliphatic hydrocarbons to aromatic hydrocarbons in commercially desirable yields and are generally highly effective in conversion reactions involving aromatic hydrocarbons. Although they have unusually low alumina contents, i.e., high silica to alumina ratios, they are very active even when the silica to alumina ratio exceeds 30. The activity is surprising since catalytic activity is generally attributed to framework aluminum atoms and cations associated with these aluminum atoms. These zeolites retain their crystallinity for long periods in spite of the presence of steam at high temperature which induces irreversible collapse of the framework of other zeolites, e.g., of the X and A type.

An important characteristic of the crystal structure of this class of zeolites is that it provides constrained access to, and egress from the intracrystalline free space by virtue of having a pore dimension greater than about 5 Angstroms and pore window of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon or aluminum atoms at the centers of the tetrahedra. Briefly, the preferred type zeolites useful in this invention possess, in combination: a silica to alumina mole ratio of at least about 12; and a structure providing constrained access to the intracrystalline free space.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina mole ratio of at least 12 are useful, it is preferred to use zeolites having higher ratios of at least about 30. Such zeolites, after activation, acquire an intracrystalline sorption capacity for normal hexane which is greater than that for water, i.e., they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexane is excluded and the zeolite is not of the desired type. Windows of 10-membered rings are preferred, although, in some instances, excessive puckering or pore blockage may render these zeolites ineffective. Twelve-membered rings do not generally appear to offer sufficient constraint to produce the advantageous conversions, although puckered structures exist such as TMA offretite which is a known effective zeolite. Also, structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000° F. for at least 15 minutes. The zeolite is then flushed with helium and the temperature adjusted between 550° F. and 950° F. to give an overall conversion between 10% and 60%. The mixture of hydrocarbons is passed at a 1 liquid hourly space velocity (i.e., 1 volume of liquid hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10}(\text{fraction of n-hexane remaining})}{\log_{10}(\text{fraction of 3-methylpentane remaining})}$$

The constraint index approximates the ratio of the cracking rate constants for the two hydrocarbons. Zeolites suitable for the present invention are those having a constraint index in the approximate range of greater than about 2 to about 12.

Constraint Index (CI) values for some typical zeolites are:

| ZEOLITE | C.I |
|---|---|
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2.0 |
| Clinoptilolite | 3.4 |
| TMA Offretite | 3.7 |
| Beta | 0.6 |
| ZSM-4 | 0.5 |
| H-Zeolon | 0.4 |
| REY | 0.4 |
| Amorphous Silica-Alumina (non-zeolite) | 0.6 |
| Erionite | 38 |

It is to be realized that the above constraint index values typically characterize the specified zeolites but that such are the cumulative result of several variables used in determination and calculation thereof. Thus, for a given zeolite depending on the temperature employed within the aforenoted range of 550° F. to 950° F., with accompanying conversion between 10% and 60%, the constraint index may vary within the indicated approximate range. Likewise, other variables such as the crystal size of the zeolite, the presence of possible occluded contaminants and binders intimately combined with the zeolite may affect the constraint index. It will accordingly be understood by those skilled in the art that the constraint index, as utilized herein, while affording a highly useful means for characterizing the zeolites of interest is approximate, taking into consideration in manner of its determination; with probability, in some instances, of compounding variable extremes.

While the above experimental procedure will enable one to achieve the desired overall conversion of 10 to 60% for most catalyst samples and represents preferred conditions, it may occasionally be necessary to use somewhat more severe conditions for samples of very low activity, such as those having a very high silica to alumina ratio. In those instances, a temperature of up to about 1000° F. and a liquid hourly space velocity of less than one, such as 0.1 or less, can be employed in order to achieve a minimum total conversion of about 10%.

The class of zeolites defined herein is exemplified by ZSM-5, ZSM-11, ZSM-23, ZSM-35 and other similar materials. U.S. Pat. No. 3,702,886 describing and claiming ZSM-5 is incorporated herein by reference.

ZSM-11 is more particularly described in U.S. Pat. No. 3,709,979, the entire contents of which is incorporated herein by reference.

ZSM-23 is more particularly described in U.S. Pat. No. 4,076,842, the entire contents of which is incorporated herein by reference.

ZSM-35 is more particularly described in U.S. Pat. No. 4,016,245, the entire contents of which is incorporated herein by reference.

The specific zeolites described, when prepared in the presence of organic cations, are unsuitable for use herein, possibly because the intracrystalline free space is occupied by organic cations from the forming solution. They may be made suitable by calcination in an inert atmosphere at 1000° F. for one hour. If desired these zeolites can be base exchanged with suitable compounds, e.g. salts, to get desired cationic form, e.g. sodium, cesium, hydrogen, ammonium, etc. A particularly preferred form of the zeolite is the sodium form. The presence of organic cation in the forming solution may not be absolutely essential to the formation of this type zeolite; however, the presence of these cations does appear to favor the formation of this special type zeolite.

Natural zeolites may sometimes be converted to this type zeolite catalyst by various activation procedures and other treatments such as base exchange, steaming, alumina extraction and calcination, in combinations. Natural minerals which may be so treated include ferrierite, brewsterite, stilbite, dachiardite, epistilbite, heulandite, and clinoptilolite. The preferred crystalline zeolites are ZSM-5, ZSM-11, ZSM-23 and ZSM-35, with ZSM-5 particularly preferred.

In a preferred aspect of this invention, the zeolites hereof are selected as those having a crystal framework density, in the dry hydrogen form, if not substantially below about 1.6 grams per cubic centimeter. It has been found that zeolites which satisfy all three of these criteria are most desired. Therefore, the preferred zeolites of this invention are those having a constraint index, as defined above of greater than about 2 to about 12, a silica to alumina mole ratio of at least about 12 and a dried crystal density of not less than about 1.6 grams per cubic centimeter. The dry density for known structures may be calculated from the number of silicon plus aluminum atoms per 100 cubic Angstroms, as given, e.g., on Page 19 of the article on *Zeolite Structure* by W. M. Meier.

This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pykonmeter techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density, of course, must be associated with a relative small amount of free space within the crystal, which might be expected to result in more stable structures. This free space, however, is important as the locus of catalytic activity.

Crystal framework densities of some typical zeolites are:

| Zeolite | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of ammonium form to yield the hydrogen form. In addition to the hydrogen form, other forms of the zeolite wherein the original alkali metal has been reduced to less than about 1.5 percent by weight may be used. Thus, the original alkali metal of the zeolite or introduced hydrogen cations may be replaced by ion exchange with other suitable ions of Groups I to VIII of the Periodic Table, including, by way of example, nickel, cadmium, copper, zinc, palladium, calcium or rare earth metals.

The following examples will serve to illustrate the process of the invention without limiting the same:

EXAMPLE 1

A representative member of the novel class of zeolites of this invention is Na-ZSM-5. Said zeolite was prepared as follows:

An organics salt solution, was prepared by mixing 1.6 parts of n-propyl bromide, 1.9 parts of tri-n-propylamine, 3.1 parts of methyl ethyl ketone and 10.4 parts of water. The mixture was reacted at about 100° C. for about 14 hours. The aqueous phase of the reacted mixture is designated Solution A.

A sodium silicate solution was prepared by mixing 16 parts water and 27.7 parts sodium silicate (28.7 wt % $SiO_2$, 8.9 wt % $Na_2O$, 62.4% $H_2O$) followed by addition of 0.08 parts Daxad 27 (W. R. Grace Chem. Div.). The solution was cooled to approximately 15° C.

An acid solution was prepared by adding 1 part aluminum sulfate (17.2 wt % $Al_2O_3$) to 16.4 parts water followed by 2.4 parts NaCl and 2.9 parts of Solution A.

These solutions were mixed in an agitated vessel while 3.9 parts of NaCl were added. The gel molar ratios expressed as oxides are the following.

$SiO_2/Al_2O_3 = 78.4$
$Na_2O/Al_2O_3 = 49.9$

The gel was agitated for 4 hours at ambient temperature then heated to 95°–110° C. and held for 40 hours with severe agitation. When approximately 65% of the gel was crystallized, the temperature was increased to 150°–160° C. and held there until crystallization was complete.

The zeolite slurry product was diluted with 4–5 parts water per part slurry and 0.0002 parts of flocculent (Rohm & Hass Primafloc C-7) per part slurry, allowed to settle and supernatant liquid was drawn off. The settled solids were reslurried to the original volume of the preceding step with water and 0.00005 parts of flocculent per part slurry. After settling, the aqueous phase was decanted. This procedure was repeated until the sodium level of the zeolite was less than 1.0 wt %. The washed zeolite was then filtered, dried and identified as ZSM-5 having a silica/alumina mol ratio of at least 12; i.e., about 70, and a constraint index of between 1 and 12; i.e., about 8.3.

Ten grams of the dried zeolite product was calcined in flowing $N_2$ for 3 hours at 538° C. then mixed with about 100 ml of 1 N sodium chloride solution containing a sufficient amount of sodium hydroxide solution to arrive at a pH above 10.

EXAMPLE 2

A 10 gram sample of zeolite Na-ZSM-5 prepared according to Example 1 was contacted with 300 ml of a $5 \times 10^{-3}$ M aqueous solution of tetraammineplatinum (II) chloride. The tetraammineplatinum (II) chloride was obtained from the Alfa Division of Ventron Corporation, Massachusetts. The zeolite quantitatively sorbed the platinum complex even in the presence of a 100-fold molar excess of sodium ions.

EXAMPLE 3

A 10 gram sample of zeolite Na-ZSM-5 prepared according to Example 1 was contacted with 300 ml of a $5 \times 10^{-3}$ M aqueous solution of tetraamminepalladium (II) chloride. The tetraamminepalladium (II) chloride was obtained from the Alfa Division of Ventron Corporation, Massachusetts. The zeolite quantitatively sorbed the palladium complex even in the presence of a 100-fold molar excess of sodium ions.

EXAMPLE 4

Na-ZSM-11 can be prepared as follows:

A sodium silicate solution is prepared by mixing 14.4 parts sodium silicate (28.7 wt % $SiO_2$, 8.9 wt % $Na_2O$, 62.4 wt % $H_2O$) with 8.4 parts water and 0.04 parts Daxad 27 (W. R. Grace Chem. Co.)

An acid solution is prepared by mixing 1 part aluminum sulfate (17.2 wt % $Al_2O_3$), 1.4 parts sulfuric acid, 0.8 parts sodium chloride and 6.3 parts water.

The silicate solution and acid solution are combined in a mixing nozzle and the resulting gel is discharged into an agitated vessel to which 0.4 parts of water is added. The gel is thoroughly mixed at ambient temperature and 0.6 parts of sodium chloride is added to the mixture. Finally, a solution containing 1.4 parts of tetrabutylammonium bromide and 2.1 parts water are added to the mixture. The temperature of the gel mixture is raised to 220° F. with severe agitation and is held for 256 hours until crystallization is complete. The crystallized product is cooled, filtered, washed free of soluble salts and dried.

Ten grams of the dried zeolite product is calcined in flowing nitrogen for 3 hours at about 540° C. then mixed with about 100 ml of 1 N sodium chloride solution containing a sufficient amount of sodium hydroxide solution to attain a pH above about 10.

EXAMPLE 5

The zeolite sample prepared according to Example 4 is contacted with 300 ml of a $5 \times 10^{-3}$ M aqueous solution of tetraammineplatinum (II) chloride. The tetraammineplatinum (II) chloride can be obtained from the Alfa Division of Ventron Corporation, Massachusetts. The zeolite quantitatively sorbed the platinum complex.

What is claimed is:

1. A process for the separation and recovery of precious metals selected from platinum and palladium, which process comprises the steps of:
    (a) forming a solution of an ammine complex of a precious metal selected from platinum and palladium;
    (b) contacting said solution with one or more members of a novel class of zeolites characterized by a silica to alumina mole ratio of at least 12 and a constraint index within the approximate range of greater than about 2 to about 12, to selectively sorb said ammine complex;
    (c) desorbing said precious metal from said zeolite by ion-exchange with a cation; and
    (d) recovering said precious metal.

2. The process of claim 1 wherein said member of the novel class of zeolites is selected from the group consisting of ZSM-5, ZSM-11, ZSM-23 and ZSM-35.

3. The process of claim 2 wherein said member of the novel class of zeolites is ZSM-5.

4. The process of claim 3 wherein said zeolite is Na-ZSM-5.

5. The process of claim 1 wherein said zeolite is in the sodium form.

6. The process of claim 1 wherein said ammine complex is $Pt(NH_3)_4^{+2}$.

7. The process of claim 1 wherein said ammine complex is $Pd(NH_3)_4^{+2}$.

8. The process of claim 1 wherein forming a solution of said ammine complex comprises dissolving said precious metal in an acid and then adding an amine until the solution becomes basic.

9. The process of claim 8 wherein the added amine is ammonia.

10. The process of claim 8 wherein said acid is aqua regia.

11. The process of claim 1 wherein said solution of an ammine complex is an aqueous solution.

12. The process of claim 1 wherein forming a solution of said ammine complex comprises contacting a salt of said precious metal with an amine solution.

13. The process of claim 12 wherein said amine solution is ammonium hydroxide solution.

14. The process of claim 1 wherein said cation used in desorbing the precious metal is an ammonium ion.

15. The process of claim 1 wherein said cation used in desorbing the precious metal is a alkylammonium ion.

16. The process of claim 1 wherein said cation is tetramethylammonium ion.

17. The process of claim 1 wherein recovering said precious metal is achieved by treatment with reducing agents.

18. The process of claim 1 wherein recovering said precious metal is achieved by thermal decomposition.

19. The process of claim 1 wherein said zeolite is regenerated after said desorbing by calcination.

20. The process of claim 19 wherein said zeolite is further regenerated after said desorbing by base exchange following said calcination.

21. The process of claim 1 wherein said precious metals are separated from other metals selected from the group consisting of rhodium, iridium and cobalt.

22. The process of claim 1 wherein said precious metals are recovered from catalytic mufflers.

23. The process of claim 1 wherein said precious metals are recovered from spent catalysts.

24. A process for the selective concentration and/or separation of precious metals selected from platinum and palladium, which process comprises contacting a solution of an ammine complex of said precious metal with one or more members of a novel class of zeolites characterized by a silica to alumina mole ratio of at least 12 and a constraint index within the approximate range of greater than about 2 to about 12.

25. The process of claim 24 wherein said member of the novel class of zeolites is selected from the group consisting of ZSM-5, ZSM-11, ZSM-23 and ZSM-35.

26. The process of claim 25 wherein said member of the novel class of zeolites is ZSM-5.

27. The process of claim 26 wherein said zeolite is in the sodium form.

28. The process of claim 26 wherein said zeolite is Na-ZSM-5.

29. The process of claim 24 wherein said ammine complex is $Pt(NH_3)_4^{+2}$.

30. The process of claim 24 wherein said ammine complex is $Pd(NH_3)_4^{+2}$.

31. The process of claim 24 wherein said ammine complex is formed by treating a precious metal containing material in an acid and then adding an amine solution until the solution becomes basic.

32. The process of claim 31 wherein said amine solution is ammonium hydroxide solution.

33. The process of claim 31 wherein said acid is aqua regia.

34. The process of claim 24 wherein said solution of an ammine complex is an aqueous solution.

35. The process of claim 24 wherein said ammine complex is formed by contacting a salt of said precious metal with an amine solution.

36. The process of claim 35 wherein said amine solution is ammonium hydroxide solution.

37. The process of claim 24 wherein said precious metals are separated from other metals selected from the group consisting of rhodium, iridium and cobalt.

* * * * *